Patented Jan. 30, 1934

UNITED STATES PATENT OFFICE 1,944,962

MANUFACTURE OF EDIBLE FATS

Bruno Behrend, Berlin, Germany

No Drawing. Application February 16, 1933, Serial No. 657,101, and in Germany February 20, 1932

11 Claims. (Cl. 99—13)

The invention relates to a process for the manufacture of margarine.

The process is characterized by churning of the fat mixture both with malt wort or malt extract and with lipoids, in particular lecithin or cholesterine.

The use of malted milk by itself is known in the margarine industry. Vegetable and egg yolk lecithin have also been used in the manufacture of edible fats and margarine.

It has been found however according to the invention, that the technical advantage attained by the use in combination of malt wort or extract and lipoids, in particular lecithin, far exceeds anything which might be expected in the present case as a result of the properties of the individual ingredients.

In the simplest mode of procedure, a concentrated malt extract solution for example in water or milk is made or a malt wort used as such, and the lipoids, in particular lecithin, if desirable dissolved in oil, are first added to the fat or oil mixture and the whole then churned in the usual way.

It has been found that by the use in combination of malt wort or extract and lipoids, in particular lecithin, the malt wort or extract with the lipoids, in particular lecithin, yields an entirely stable, homogeneous emulsion which can easily be dispersed in water or milk.

It has been found particularly advantageous for the mixing of the malt extract or wort and the lipoids, in particular lecithin, to be effected not in the churning itself, but before churning, a homogeneous lipoid—malt extract mixture being first made and this homogeneous product if necessary dissolved in water or milk and the churning process only then commenced.

This preliminary homogenizing of the lipoid with the malt extract results in the later emulsion of the preparation in aqueous liquor being particularly stable and fine. It is further of advantage that at the moment of use a uniform preparation is already at hand whereby the desired percentage can very simply be added in the churning of margarine or the preparation of other edible fats.

The dispersing power of the lipoid in the malt wort or extract is so great that the emulsifying oils hitherto necessary when lipoids are used, can be omitted. Even with fats having poor water binding powers as for instance with the use of earth nut, soya bean and whale oil (so called soft fats) and so forth hardened (at 32-34° C. a satisfactory emulsion can be obtained without the use of expensive imported emulsifying oils.

The emulsion produced by the use in combination of malt worts or extracts and lipoids is surprisingly homogeneous and finely divided, so that no undesirable separation occurs whether churning is effected "water in oil" or vice versa.

It is particularly mentioned that the making of entirely milk free emulsions is made easily possible by the use in combination of malt worts or extract with the lipoids. The emulsions prepared without milk and the finished products are not to be distinguished from products made with milk.

As the making of milk-free emulsions can now be effected so very conveniently, it is also possible to make bacteria-free margarine without the time wasting ripening process hitherto necessary.

For example margarine made according to the process with water alone and no milk does not weep with resulting variations in weight; the water content is fully retained. Its structure is smooth even with a high percentage of liquid oils; it further has considerable keeping power and leaves a butter-like fine sediment.

The suitability of the fat for baking, its browning, frothing and in particular the butter aroma are increased in the products made according to the process, while spitting and sticking in the frying pan are reduced. Digestibility is increased.

In consequence of the omission of ripening and the shortened churning process due to the smooth emulsion, it is possible to increase considerably the production of a plant with the same equipment.

Owing to the extreme fineness of the churned masses it is also possible to accelerate the cooling process, so that the output of a cooling drum per unit of time is increased.

It is also possible by the present process even with relatively high external temperatures, to use a fairly high percentage of liquid oils, whereby the cost is reduced and in addition the margarine acquires a butter-like gloss.

The saving of lipoids by the use in combination of malt extract with lipoids, as compared with the known processes using only lipoids, merely needs to be pointed out.

The invention is illustrated by the following numerical example.

Example

Composition of the churn charge for an external temperature of +25° C.

| | Parts |
|---|---|
| Fish oil hardened at 40 to 42° C | 20 |
| Fish oil or earth nut oil hardened at 30 to 32° C | 35 |
| Palm kernel oil or coco-nut oil | 20 |
| Soya bean or earth nut oil | 25 |
| Fat and oil mixture | 100 |

To these 100 parts of fat and oil mixture are added 20 parts of soured skimmed milk or water in which about 1.8 parts of lecithin-malt extract emulsion are dispersed and which consists for example of 75% dry substance and 10% pure lecithin.

The following table gives the separating times at +35° C. of the above churn charge with and without lipoid-malt extract.

|  | With lecithin-malt extract emulsion | Without lecithin-malt extract emulsion |
|---|---|---|
| After 5 minutes |  | Slightly flocculent. |
| After 10 minutes |  | Slightly flocculent. |
| After 15 minutes |  | Settles. |
| After 20 minutes |  | ⅓ separated. |
| After 30 minutes | Settles | Completely separated. |
| After 40 minutes | ⅓ separated | Completely separated. |

What I claim is:

1. In the manufacture of margarine, adding an emulsion containing malt extract and a lipoid to the fat mixture.

2. In the manufacture of margarine, adding an emulsion containing malt extract and a lipoid to the fat mixture before churning.

3. In the manufacture of margarine, adding a liquid containing an emulsion of malt extract and lecithin to the fat mixture.

4. In the manufacture of margarine, churning the fat mixture with malt extract and a lipoid.

5. In the manufacture of margarine, churning the fat mixture with malt extract and lecithin.

6. In the manufacture of margarine, churning the fat mixture with malt extract and cholesterine.

7. In the manufacture of margarine, churning the fat mixture with a homogeneous lipoid-malt extract mixture.

8. In the manufacture of margarine, churning the fat mixture with a homogeneous lecithin-malt extract mixture.

9. In the manufacture of margarine, churning the fat mixture with soured skimmed milk having lecithin and malt extract dispersed therein.

10. In the manufacture of margarine, churning the fat mixture with water having lecithin and malt extract dispersed therein.

11. Margarine containing emulsified malt extract and a lipoid.

BRUNO BEHREND.